United States Patent [19]
Burnett

[11] Patent Number: 5,888,132
[45] Date of Patent: Mar. 30, 1999

[54] POST KILL TENDERIZATION OF POULTRY MEAT THROUGH CONSTANT ELECTRICAL STIMULATION

[76] Inventor: Bertram B. Burnett, 1202 Winona Ave., Waycross, Ga. 31503

[21] Appl. No.: 935,024

[22] Filed: Sep. 22, 1997

Related U.S. Application Data

[63] Continuation of Ser. No. 637,032, Apr. 24, 1996, which is a continuation-in-part of Ser. No. 212,231, Mar. 12, 1994, Pat. No. 5,512,014.

[51] Int. Cl.$^6$ .......................................... A22C 9/00
[52] U.S. Cl. ................................ 452/141; 452/58; 452/63
[58] Field of Search ................................ 452/141, 58, 63, 452/65

[56] References Cited

U.S. PATENT DOCUMENTS

| | | |
|---|---|---|
| 2,544,681 | 3/1951 | Harsham et al. . |
| 2,544,724 | 3/1951 | Rentschler . |
| 2,621,362 | 12/1952 | Cosden . |
| 2,879,539 | 3/1959 | Cervin . |
| 3,474,490 | 10/1969 | Groover et al. . |
| 4,153,971 | 5/1979 | Simonds . |
| 4,221,021 | 9/1980 | Swilley . |
| 4,340,993 | 7/1982 | Cook . |
| 4,358,872 | 11/1982 | VanZandt . |
| 4,495,676 | 1/1985 | Hartmetz, II . |
| 4,561,149 | 12/1985 | Nijhuis . |
| 4,675,947 | 6/1987 | Clatfelter et al. . |
| 4,860,403 | 8/1989 | Webb et al. . |
| 5,397,263 | 3/1995 | Schumann et al. ................... 452/58 |
| 5,512,014 | 4/1996 | Burnett ................................. 452/141 |

FOREIGN PATENT DOCUMENTS

| | | |
|---|---|---|
| 1168604 | 6/1984 | Canada . |
| 2495438 | 6/1982 | France . |
| 2519846 | 7/1983 | France . |
| 3604738 | 2/1986 | Germany . |
| 833182 | 5/1981 | U.S.S.R. . |
| 1009382 | 4/1983 | U.S.S.R. . |

OTHER PUBLICATIONS

S.G. Birkhold and A.R. Sams; "Comparative Ultrastructure of Pectoralis Fibers from Electrically Stimulated and Muscle-Tensioned Broiler Carcasses"; 1995 Poultry Science 74; pp. 194–200.

West and Todd; Textbook of Biochemistry; 3rd Edition; 1965; p. 1165.

L.T. Walker, S.D. Shackelford, S.G. Birkhold and A.R. Sams; "Biochemical and Structural Effects of Rigor Mortis-Accelerating Treatments in Broiler Pectoralis"; 1995 Poultry Science 74; pp. 176–188.

1992 Poultry Science 71; Supplement 1; p. 30.

D.P. Smith and D.L. Fletcher; "Chicken Breast Muscle Fiber Type and Diameter as Influenced by Age and Intramuscular Location"; 1988 Poultry Science 67; pp. 908–913.

A.R. Sams and D.M. Janky; "Research Note: Simultaneous Histochemical Determination of Three Fiber Types in Single Sections of Broiler Skeletal Muscles"; 1990 Poultry Science 69; pp. 1433–1436.

A.R. Sams and D.M. Janky; "Characterization of Rigor Mortis Development in Four Broiler Muscles"; 1991 Poultry Science 70; pp. 1003–1009.

(List continued on next page.)

*Primary Examiner*—Willis Little
*Attorney, Agent, or Firm*—Locke Purnell Rain Harrell

[57] ABSTRACT

An apparatus and method for automatically electrically stimulating poultry carcasses in poultry processing plants in order to tenderize the poultry meat are disclosed. Carcasses suspended by shackles from a moving processing line are transported between two preferably curved electrical conductive bars, which are positioned to apply the electrical stimulation across the breast of the suspended carcass. The carcasses may otherwise be dragged through a charged saline or water solution, or across a charged metal mesh or grill. The carcasses are subjected to almost constant electrical stimulation for 8 to 13 seconds by the application of an intermediate level, 100 percent duty cycle, AC voltage for the period of stimulation.

20 Claims, 8 Drawing Sheets

OTHER PUBLICATIONS

Y. Li, T.J. Siebenmorgen and C.L. Griffis; "Electrical Stimulation in Poultry: A Review and Evaluation"; 1993 Poultry Science 72; pp. 7–22.

L.T. Walker, S.G. Birkhold, I.S. Kang, E.M. Hirschler and A.R. Sams; "The Effects of Post–Mortem Electrical Stimulation and Muscle Tensioning in Two Broiler Muscles"; 1996 Poultry Science 71; pp. 1118–1120.

L.D. Thompson, D.M. Janky and S.A. Woodward; "Tenderness and Physical Characteristics of Broiler Breast Fillets Harvested at Various Times from Post–Mortem Electrically Stimulated Carcasses"; 1987 Poultry Science 66; pp. 1158–1167.

G.W. Froning and T.G. Uijttenboogart; "Effect of Post–Mortem Electrical Stimulation on Color Texture, pH, and Cooking Losses of Hot and Cold Deboned Chicken Broiler Breast Meat"; 1988 Poultry Science 67; pp. 1536–1544.

C.E. Lyon, C.E. Davis, J.A. Dickens and C.M. Papa; "Effects of Electrical Stimulation on the Post–Mortem Biochemical Changes and Texture of Broiler Pectoralia Muscle"; 1989 Poultry Science, pp. pp. 249–257.

A.R. Sams; "Electrical Stimulation and High Temperature Conditioning of Broiler Carcasses"; 1990 Poultry Science 69; pp. 1781–1786.

S.G. Birkhold, D.M. Janky and A.R. Sams; "Tenderization of Early–Harvested Broiler Breast Fillets by High–Voltage Post–Mortem Electrical Stimulation and Muscle Tensioning"; 1992 Poultry Science 71; pp. 2106–2112.

C.E. Lyong and J.A. Dickens, "Effects of Electrical Treatments and Wing Restraints on the Rate of Post–Mortem Biochemical Changes and Objectives Texture of Broiler Pectoralis Major Muscles Deboned After Chilling," 1993 Poultry Science 72; pp. 1577–1583.

L.T. Walker, S.G. Birkhold, I.S. Kang and A.R. Sams; "A Comparison of Treatments for Reducing the Toughness of Early–Harvested Broiler Pectroalis"; 1994 Poultry Science 78; pp. 464–467.

Dr. A.M. Pearson, "What's New in Research"; The National Provisioner; Jul. 3, 1982; p. 17, p. 20.

Dr. A.M. Pearson; "What's New in Research"; The National Provisioner, Mar. 27, 1982; p. 27.

"Beef Carcass Stimulator"; The National Provisioner, Sep. 1, 1979, p. 25.

"Electrical Tenderizing"; The National Provisioner, Apr. 7, 1979, p. 9.

David Amey; "Tender Meat in 24 Minutes"; Broiler Industry; Feb. 1988.

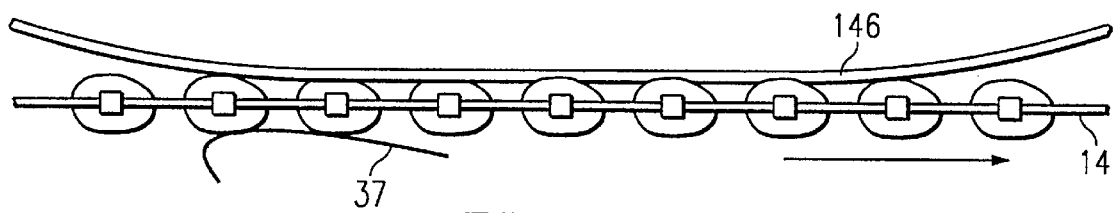
FIG. 3e
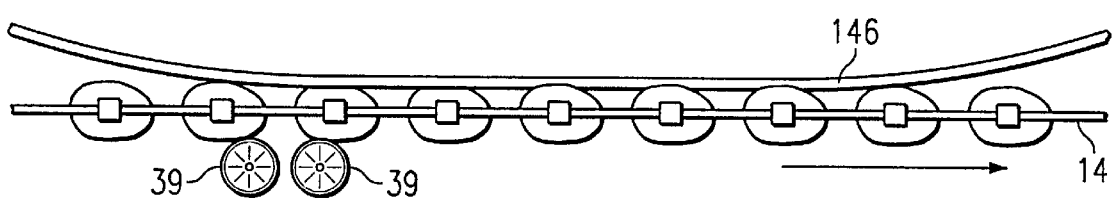
FIG. 3f
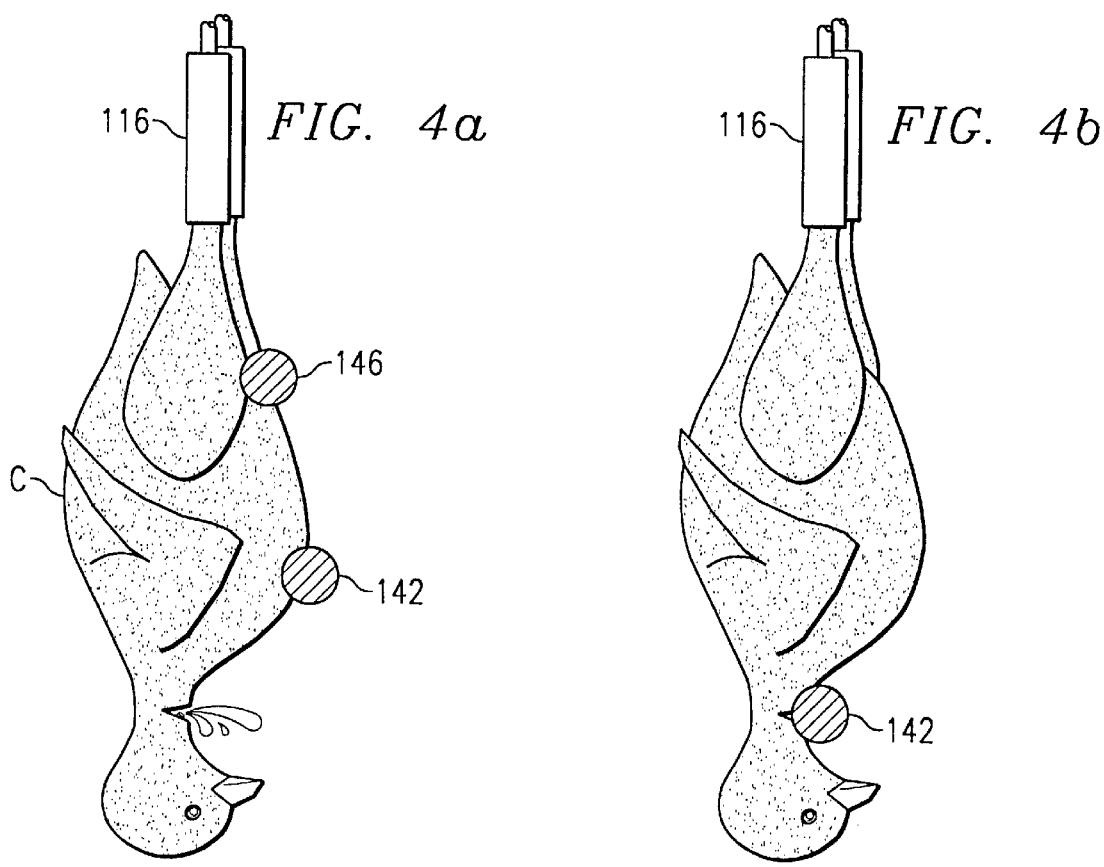
FIG. 4a
FIG. 4b

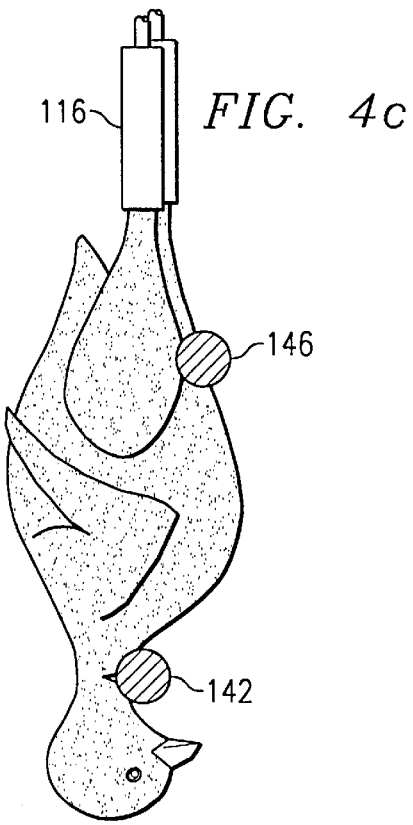
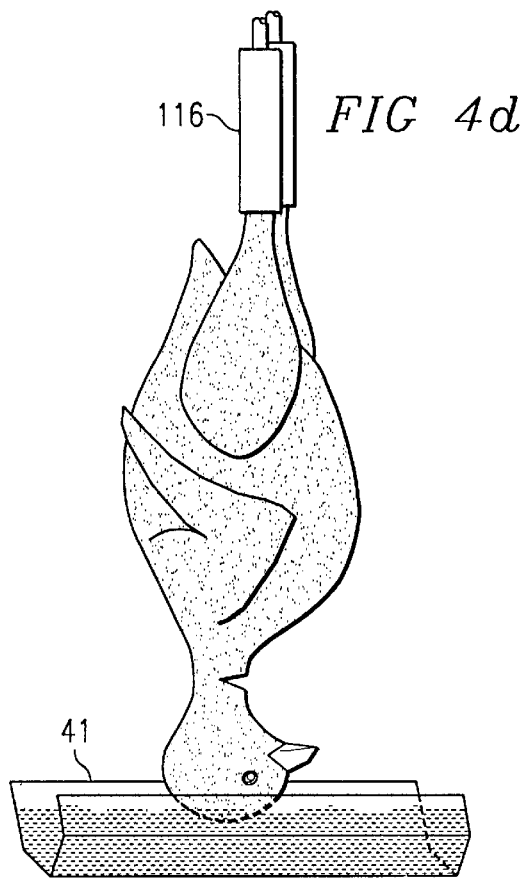
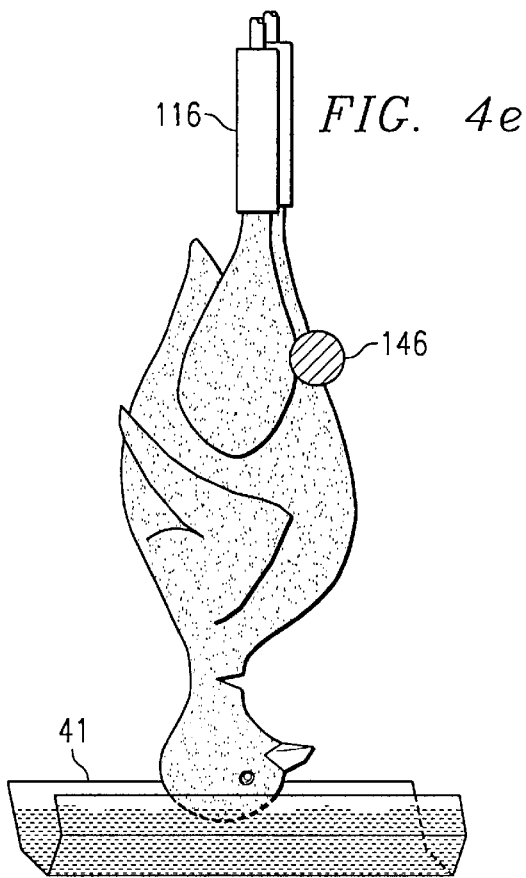

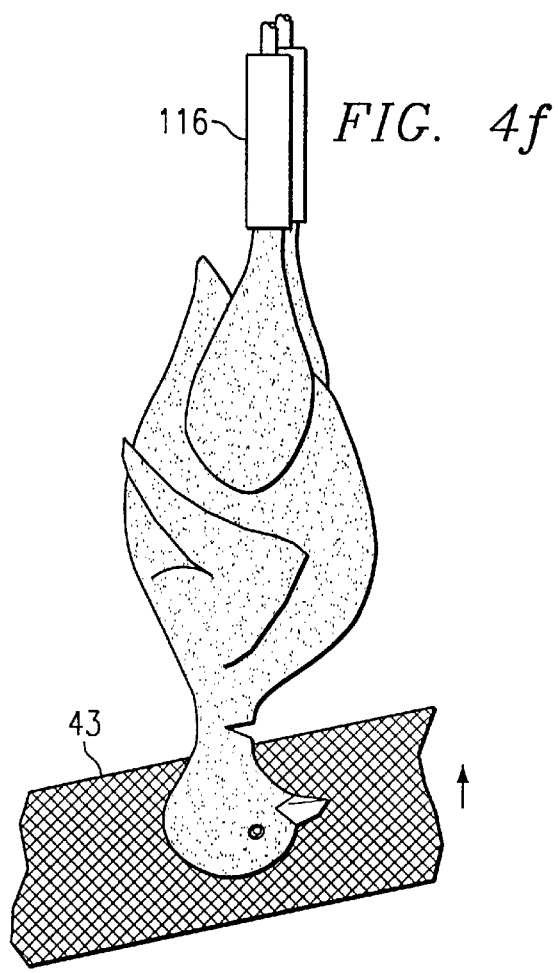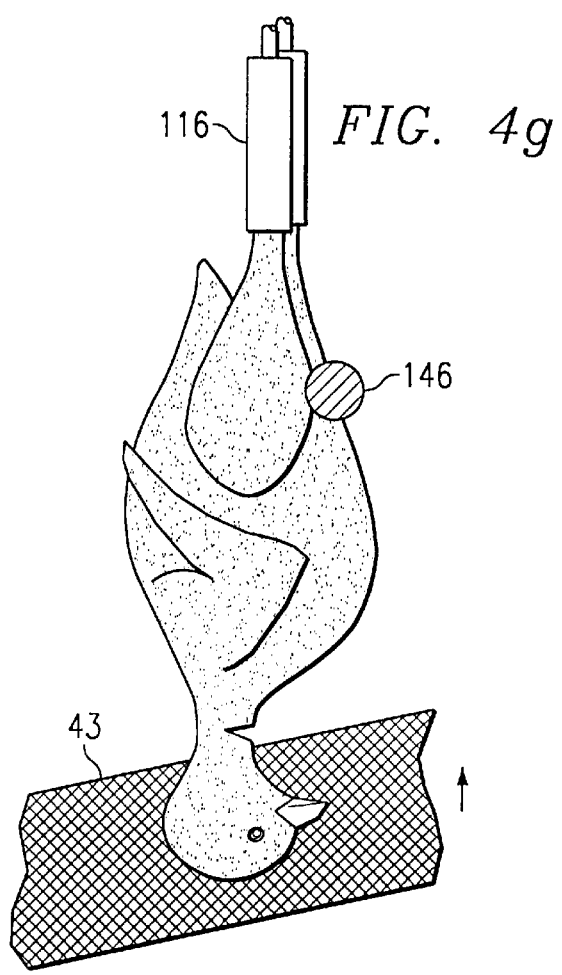

POST KILL TENDERIZATION OF POULTRY MEAT THROUGH CONSTANT ELECTRICAL STIMULATION

RELATED APPLICATIONS

This is a continuation of commonly owned U.S. patent application Ser. No. 08/637,032 filed Apr. 24, 1996, which is a continuation-in-part of commonly owned U.S. patent application Ser. No. 08/212,231, filed Mar. 12, 1994, which issued as U.S. Pat. No. 5,512,014 on Apr. 30, 1996.

BACKGROUND OF THE INVENTION

1. Field of the Invention.

The present invention relates generally to processing poultry for human consumption, and, in particular, to a method and apparatus for automatically electrically stimulating poultry carcasses in poultry plants to tenderize the poultry meat.

2. Discussion of Related Art.

The consumer demand for poultry in recent years has shifted from fresh, whole carcasses to fresh, cut-up poultry and other processed poultry products. Due to the muscle tensioning associated with rigor mortis, poultry carcasses need to be aged for four to six hours to obtain poultry breast meat which is sufficiently tender for human tastes. Because deboning non-aged poultry carcasses produces meat that is unacceptably tough to the consumer, because storing poultry carcasses for a lengthy aging period to obtain tender poultry meat is expensive, and because storing increases the risk of microbial growth and decomposition of the meat, numerous studies have been conducted in an effort to find a way to accelerate the aging process.

One line of investigation has been directed toward the electrical stimulation of poultry carcasses promptly after their slaughter as a result of some degree of acceptance of electrical stimulation of beef carcasses in the meat-packaging industry to accelerate the aging process. Wide disagreement, however, continues to exist within the beef industry over the best specific type of electrical stimulation.

Broadly speaking, three general types of electrical stimulation have received some acceptance in the meat-packing industry. In one approach, pulses in excess of 1000 volts are applied to a carcass rubbing against an electrified rail. In a second approach, high voltage pulses are applied across the hind legs of the beef carcass. In both of these approaches, electrical stimulation occurs for a period in excess of 90 seconds and in some instances for several minutes. In a third approach, a series of low voltage pulses on the order of 20 volts are applied through a rectal probe for at least 90 seconds. In each of these methods, the periods of high current flow are minimized in comparison to the spacing between the pulses to minimize or avoid burning the meat. However, due to the differences in size and meat composition, and biochemical and physiological differences in the nerve and muscle systems of beef and poultry, such approaches provide little guidance for the poultry processing industry.

As discussed in "Electrical Stimulation in Poultry, A Review and Evaluation," by Yanblin Li, T. J. Siebenmorgen, and C. L. Griffis, 1993 *Poultry Science*, numerous laboratory studies of electrical stimulation of poultry meat have been conducted since 1960, with most of the activity involving chickens conducted since 1986. Although numerous different voltages, currents, and stimulation times have been used in such studies, most have been directed to the use of high voltage pulses above 440 volts separated by periods of no stimulation, as exemplified by "Fragmentation, Tenderness and Post-Mortem Metabolism of Early-Harvested Boiler Breast Fillets from Carcasses Treated with Electrical Stimulation and Muscle Tension," by S. G. Birkhold and A. R. Sams, 1993 *Poultry Science*, March 1993.

The studies to date relating to the electrical stimulation of poultry have been inconclusive because the optimum electrical parameters, the electrical properties of poultry meat, and the biochemical and physiological responses of poultry nerve and muscle systems to electrical stimulation have not been known. Further, there has yet to be developed a practical method of automatically electrically stimulating poultry meat in poultry processing plants in order to effectively tenderize poultry breast meat without additional aging of the poultry carcasses in storage areas at the plant site.

Additionally, it has been found that skin weakness of the poultry causes skin tears which are undesirable but sometimes unavoidable in the electrical stimulation process. A need exists to minimize skin tears, or to have the skin tears occur in parts of the poultry carcass not to be utilized for human consumption, or in the less expensive portions of the carcass.

SUMMARY OF THE INVENTION

Accordingly, it is an object of this invention to provide an apparatus and method of electrically stimulating poultry carcasses in order to tenderize the poultry meat.

It is another object of the present invention to provide an apparatus for automatically stimulating poultry carcasses as they are being processed in a poultry processing plant.

It is yet another object of the invention to provide for a method of electrically stimulating poultry carcasses to substantially reduce the aging time of processed poultry meat.

It is a further object of the present invention to minimize skin tears on the poultry carcass, or to have the tears occur in an area of the carcass not utilized for human consumption, or in the less expensive portions of the carcass.

In carrying out these and other objectives of the invention, there is provided a method of electrically stimulating a poultry carcass using a constant energy source to tenderize poultry meat wherein an intermediate-level voltage is applied to the poultry carcass which is capable of supplying a substantially constant source of energy to the poultry carcass for a predetermined time period. Preferably, a constant AC voltage of between 110 and 250 volts is applied across a portion of the carcass for approximately 8–13 seconds.

One apparatus for carrying out the method of this invention includes electrically conductive bars across which the intermediate-level voltage is applied and which are positioned in a contacting relationship with a portion of the carcasses as they are transported along the processing line after being slaughtered. The conductive bars are of sufficient length to ensure that a substantially constant source of energy is supplied to a carcass for a sufficient period of time to tenderize the poultry meat. Curved conductive rub bars are used to deflect the carcasses from the vertical plane so gravity presses the carcasses against the conductive bar and to prevent larger carcasses from preventing adjacent smaller carcasses from contacting the conductive bar. Additionally, use of an electrified metal mesh or grill, or a narrow gage water trough for electrical conduction to the carcass would allow constant contraction of the carcasses, which is desired.

BRIEF DESCRIPTION OF THE DRAWINGS

FIGS. 3a and 3c–3f are top plan views of an alternative embodiments of the conductive bars and other apparatus for carrying out the present invention;

FIGS. 4a–4g are close-up isometric views of a poultry carcass suspended from the shackle portion of the apparatus of FIGS. 2a–2e;

DETAILED DESCRIPTION OF THE PREFERRED EMBODIMENT

Figure 1:
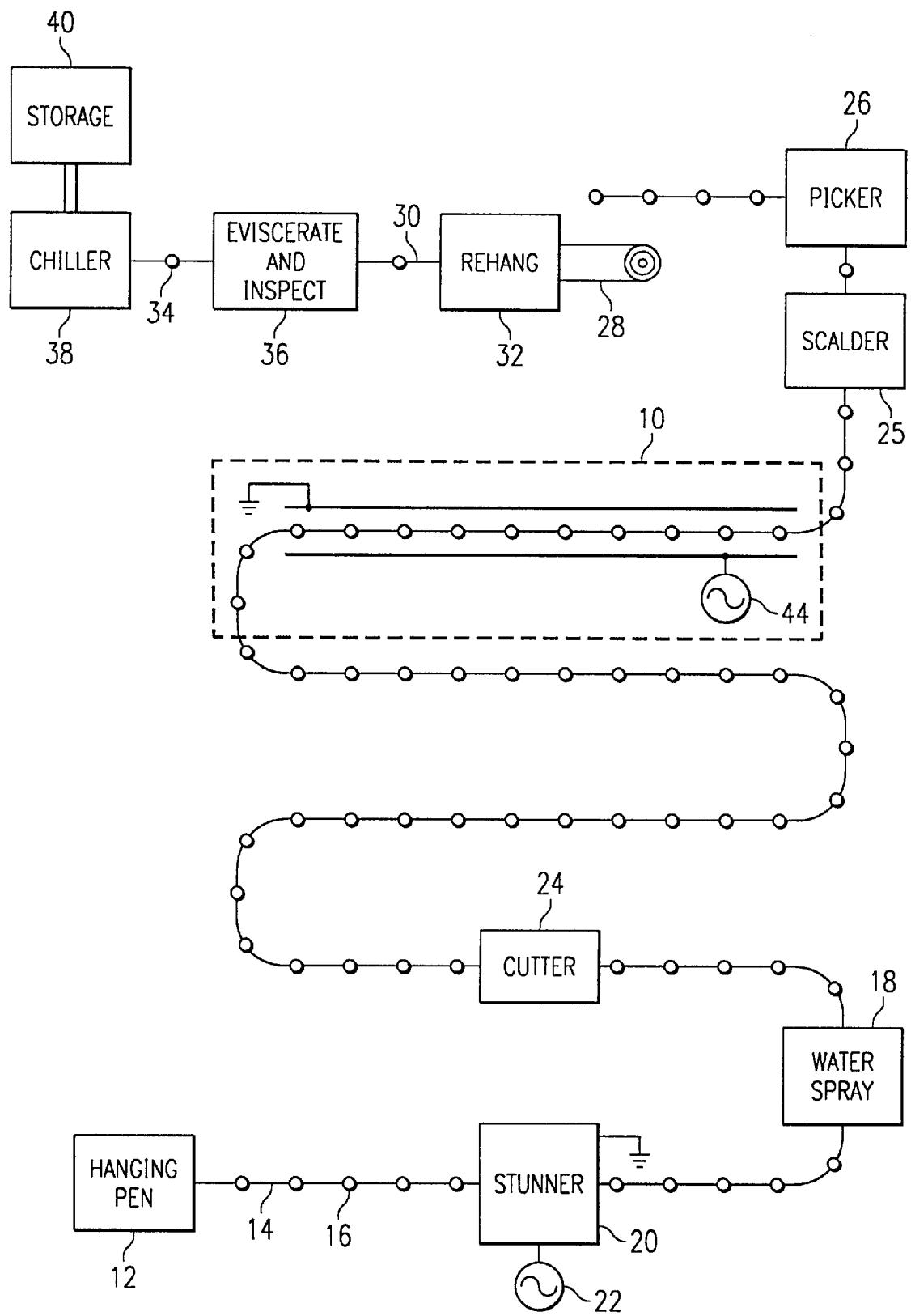
FIG. 1 is a schematic diagram of the processing steps in a poultry processing plant which has been modified in accordance with the present invention.

The invention will now be described in more detail with reference to the various Figures. FIG. 1 illustrates the processing steps of a typical poultry processing plant which have been modified by the addition of apparatus 10 for automatically electrically stimulating poultry carcasses in accordance with the present invention. Poultry, such as chickens or turkeys, are first brought to a hanging pen 12 where they are suspended from a moving processing line 14 by suitable support or suspension devices, such as shackles 16. In a typical processing plant having a processing line capacity of 140 birds per minute with shackles 16 spaced 6 inches apart, the processing line travels at 70 feet/min. Hereinafter, the invention will be described in connection with the slaughter and processing of chicken, although the present invention is also suitable for the processing of other types of poultry.

Chickens suspended from the processing line are then carried to a stunner 20 which electrically stuns the chickens to render them unconscious for slaughter. The stunner typically uses a 25 volt AC stunning voltage generated by a conventional AC voltage source 22. The stunned chickens are then transported through a water spray 18 which wets the chickens. The wetting of the feathers of the chickens by the water spray 18 promotes the electrical stimulation process.

The processing line 14 then carries the chickens by a cutter 24 which cuts the throats of the chickens. The cutter 24 is commonly located at a suitable distance from the stunner 20 so the stunned chicken is beginning to regain consciousness at the time its throat is cut. This is to ensure that the chickens bleed sufficiently.

The processing line then carries the bleeding carcass to the novel apparatus 10, shown in more detail in FIGS. 2a–2f, which automatically electrically stimulates the bleeding carcasses C with a substantially constant source of electrical energy from an intermediate voltage source for a predetermined time period, which will be described in more detailed hereinafter. Preferably, the length of the processing line 14 between the cutter 24 and a scalder 25 is sufficiently long for the chickens to bleed for approximately 90 seconds. Some tenderization can occur after bleeding for only 20 seconds, however, the preferred bleed time prior to the electrical stimulation of the carcasses is from 55–90 seconds when the poultry are dead or nearly dead. This preferred bleed time prior to electrical stimulation using the present invention will achieve the equivalent of 4 hours aging. Longer periods of bleed time can be used, but are not necessary.

Following the electrical stimulation of the chickens, the processing line 14 carries the chickens to a scalder 25 which scalds the chickens with hot water so that the feathers can be easily picked off the carcasses at the picker 26. Sometimes skin tears occur when the rubber fingers of picker 26 come into contact with the taut carcass skin. To avoid this, or to have the tear occur in a less desirable part of the carcass, constant energy may be applied to the portions of the carcass not subject to tearing at the picker, such as the neck, head or feet, or, a variable resistor—may be used to reduce the current, applied to the carcasses. These methods are explained in further detail below.

The processing line then transports the processed carcasses to a conveyor belt 28 onto which they are dropped for rehanging onto a second "clean" processing line 30 at a rehanging station 32. The second processing line 30 also has support or suspension devices 34 from which the chicken carcasses are suspended. The suspended chicken carcasses are then transported through an evisceration process 36 where the carcasses are eviscerated and then inspected by an authorized USDA inspector.

The eviscerated and inspected carcasses are then transported by the second processing line to a cold-water chiller 38 where the processed carcasses are chilled prior to storage in a storage area 40. In the operation of a poultry processing line having a 140 bird/minute processing rate, the carcass of a bird that is initially suspended from a shackle 16 on the processing line 14 at the hanging pen 12 will typically arrive at the storage area approximately one hour later.

Prior to the addition of the apparatus 10 for carrying out the present invention, the chicken carcasses were stored in the storage area 40 for four to six hours before the chickens were transported to further processing. With the present invention, the chilled carcasses are not stored prior to being processed further. Accordingly, the need for large, expensive storage areas have been eliminated, thereby reducing capital and operating costs of the processing plant while also reducing the potential for microbial growth on the stored carcasses.

Figure 2A:
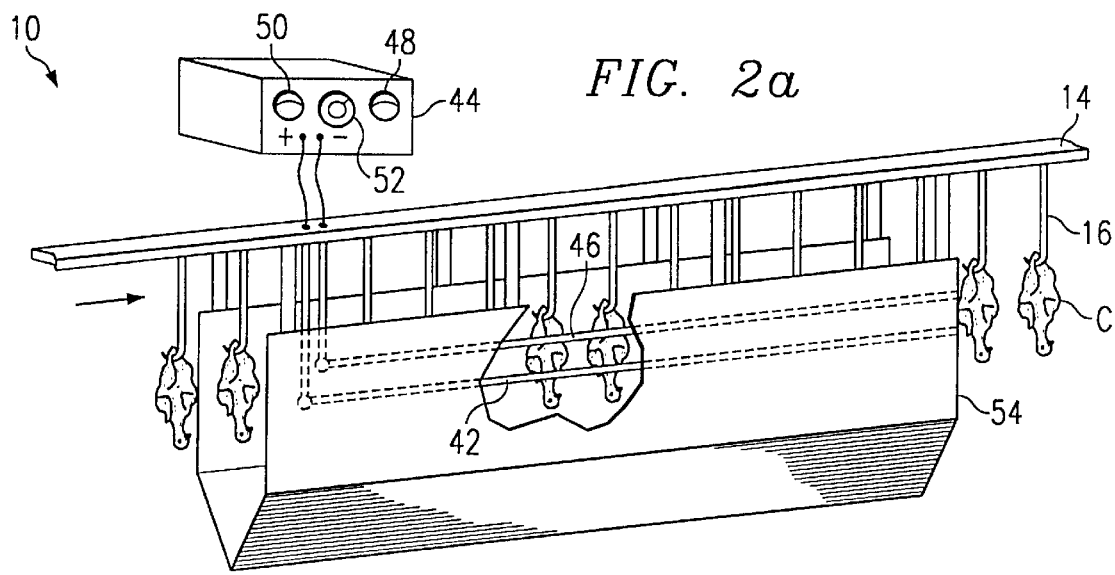
FIGS. 2a–2d are isometric cut-away views of various embodiments of apparatus suitable for carrying out the present invention in a room bleed-out.

FIG. 2a illustrates the apparatus 10 for automatically electrically stimulating the chicken carcasses C for the predetermined time period with substantially constant energy as the processing line transports the carcasses C through the apparatus 10. The apparatus includes an electrified conductive bar 42 of suitable length connected to the "hot" terminal of an intermediate voltage source 44 and another conductive bar 46 connected to common or ground terminal of the voltage source 44. The bars 42 and 46 are preferably made from stainless steel. The bars 42 and 46 are positioned below the moving processing line 14 and slightly offset from a vertical plane through the processing line 14 in order for the bars 42 and 46 to remain in a contacting relationship with the chicken carcasses C hanging from the shackles 16 as they are transported through the apparatus 10. The bars are of sufficient length that the bars remain in electrical contact with each carcass for sufficient time to electrically stimulate the carcasses so that the breasts become tender.

The intermediate voltage source 44 may include a voltmeter 48 for monitoring the voltage, an ammeter 50 for monitoring the current and a variable transformer 52 for varying the voltage within the desired voltage range. A suitable voltage source 44 is an alternating voltage source capable of generating between 110 and 250 volts and having a duty cycle at or substantially near 100 percent so that there is a substantially constant transmission of electrical energy through the carcass for the desired tenderizing period. Preferably, the voltage source 44 generates a typical commercial line grade 100 percent duty cycle, sinusoidal voltage although other types of waveforms having close to a 100 percent duty cycle may be used. For such intermediate voltages, AC currents between 120 and 500 milliamperes may be expected to pass through each of the chicken carcasses.

Preferably, the carcasses are electrically stimulated by the intermediate AC voltage between 8 and 13 seconds. The particular voltage level and tenderizing period may vary within the above-described voltage range depending on the size and weight of the carcasses and the type of waveform.

For safety reasons, the portion of the processing line 14 having electrically conductive bars 42 and 46 positioned along it is enclosed by a plexiglass shield 54.

Figure 2B:
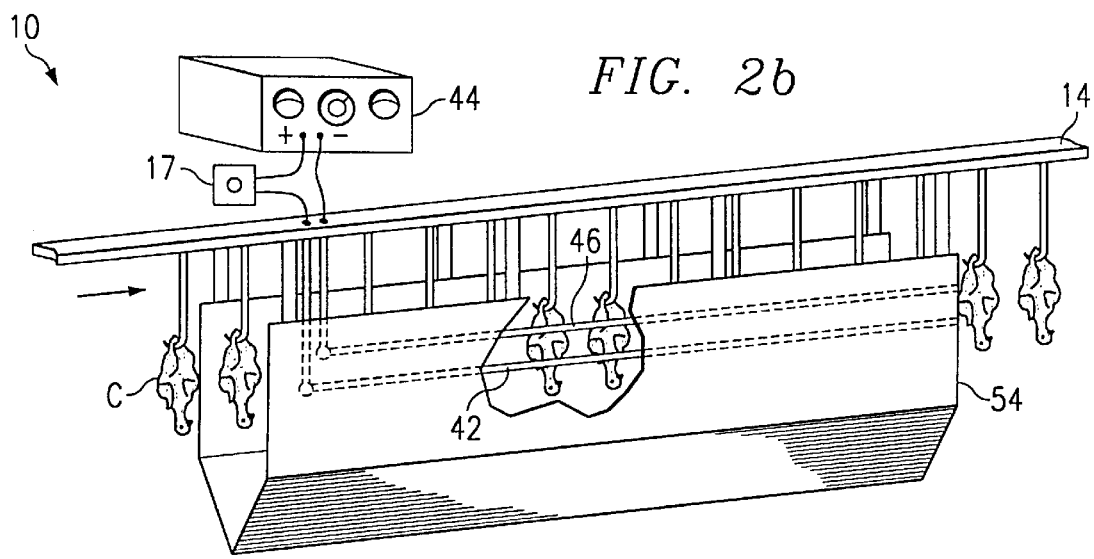
Figure 2C:
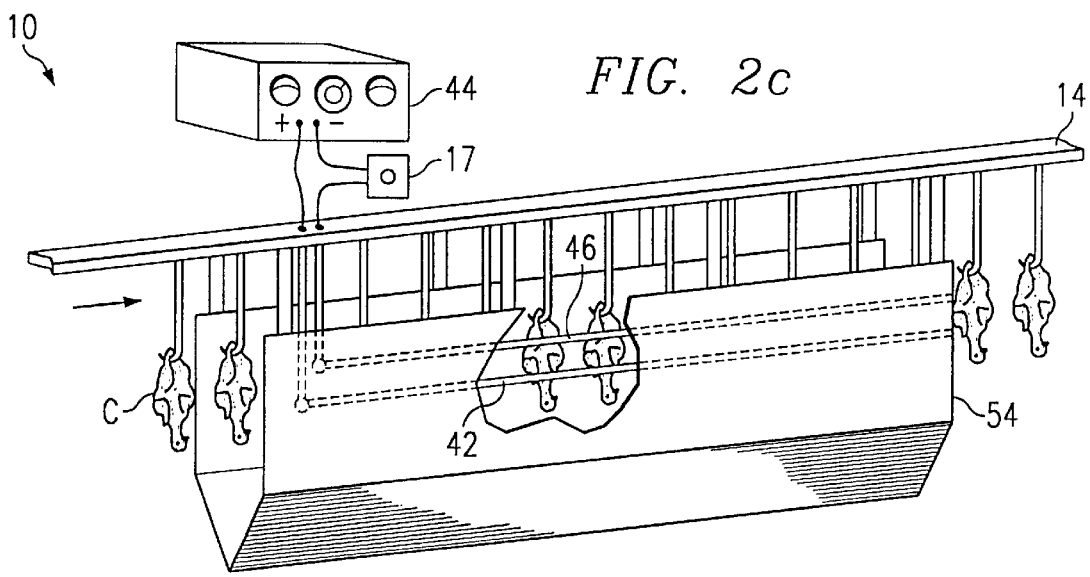

As illustrated in FIG. 2b, variable resistor 17, inserted in the positive line of voltage source 44 is utilized to reduce the current supplied to the carcasses. This will help reduce trauma to the skin of the carcass which should in turn reduce tears at the picker 26 (FIG. 1). Alternatively, as shown in FIG. 2c, a variable resistor 17 placed in the neutral or grounded line of voltage source 44 is utilized to control the amount of current flow through the breast and feet. If the variable resistor 17 is reduced to a minimum level, the current flow will be mostly through the breast of the carcass. If the resistor's value is maximized, the current flow will be mostly through the feed of the carcass. Thus, the setting of variable resistor 17 can partition the current flow between the breast and the feet such that skin tears can be prevented through trial and error.

Figure 2D:
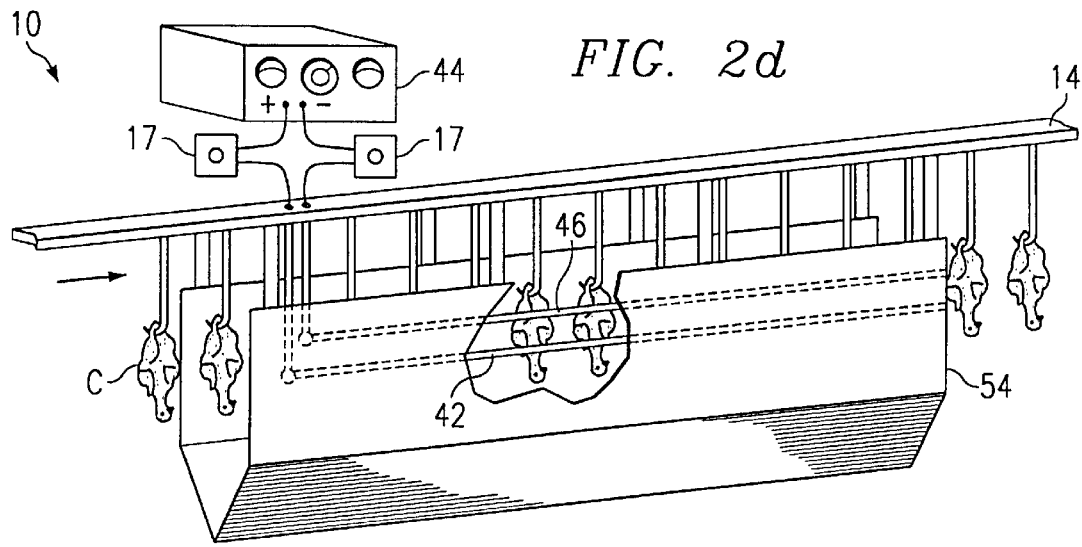

In an alternative embodiment, as illustrated in FIG. 2d, a variable resistor 17 is placed in both the positive and neutral or ground line of voltage source 44 to lower the current applied to the carcass and to partition the flow of current between the breast and the feet.

Figure 2E:
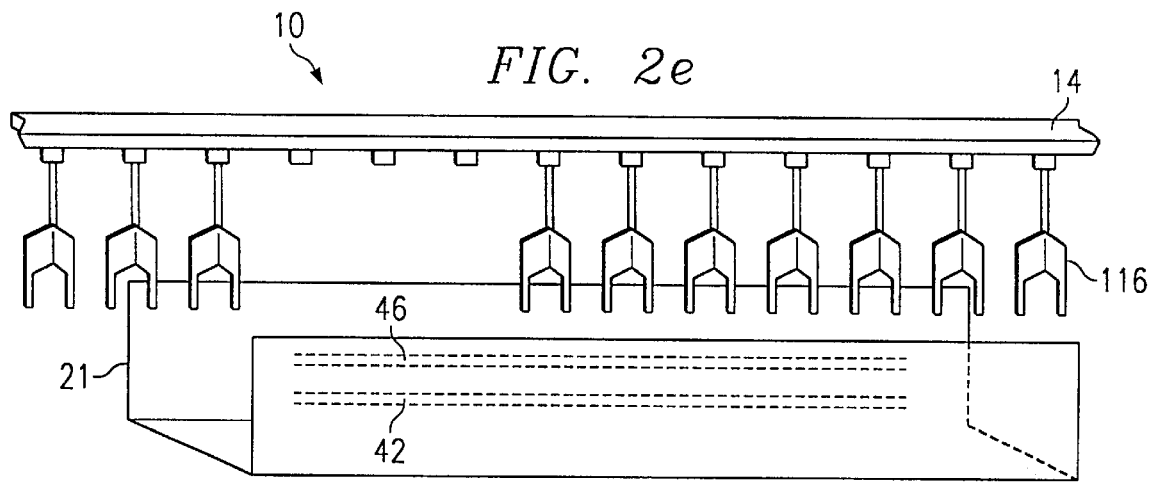
FIG. 2e is an isometric cut-away view of an embodiment of apparatus suitable for carrying out the present invention in a blood trough.
Figure 2F:
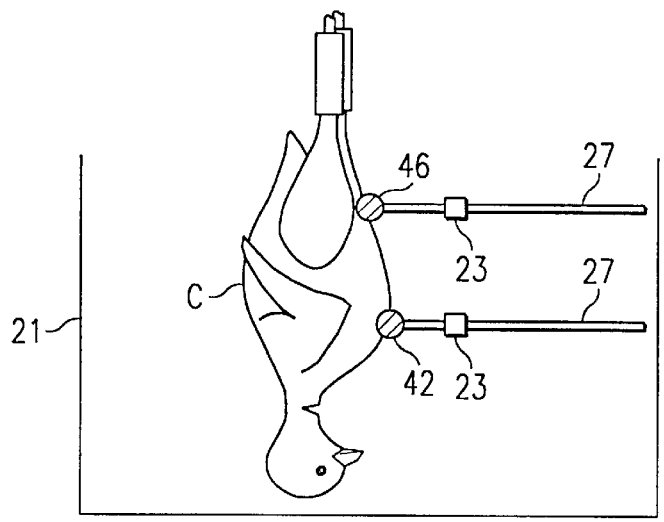
FIG. 2f is an end view of the embodiment of FIG. 2e.

FIGS. 2e and 2f illustrate an alternative embodiment where post-kill electrical stimulation is provided in a blood trough 21. This compares to the room bleed-out embodiment illustrated in FIGS. 2a–2d. As shown in FIG. 2e, conductive bars 42 and 46 are illustrated. Preferably, there is a 3.5 inch space between the two conductive bars and the bars are made of ¾ inch stainless steel. Preferably, the top bar is the ground electrode and the bottom bar is the positive electrode. As shown in FIG. 2f, which is an end-view of the blood trough 21, the carcass C passes by the ground electrode 46 where the ground electrode 46 includes an insulator block 23. Preferably, the insulator block 23 is a 2"×4" piece of Teflon. Additionally, the positive electrode 42 is shown connected to another insulator block 23 which in turn is connected to an electrode adjustment rod 27. In this embodiment, the carcasses are electrically stimulated with substantially constant electrode energy being applied as the carcasses traverse a blood trough 21 in the processing plant.

Figure 3A:
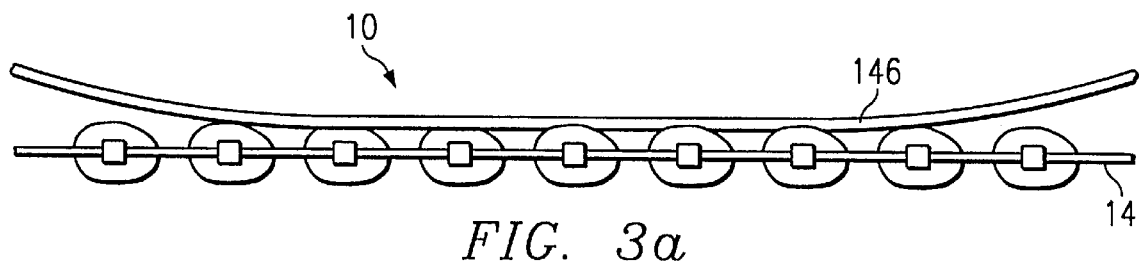
Figure 3B:
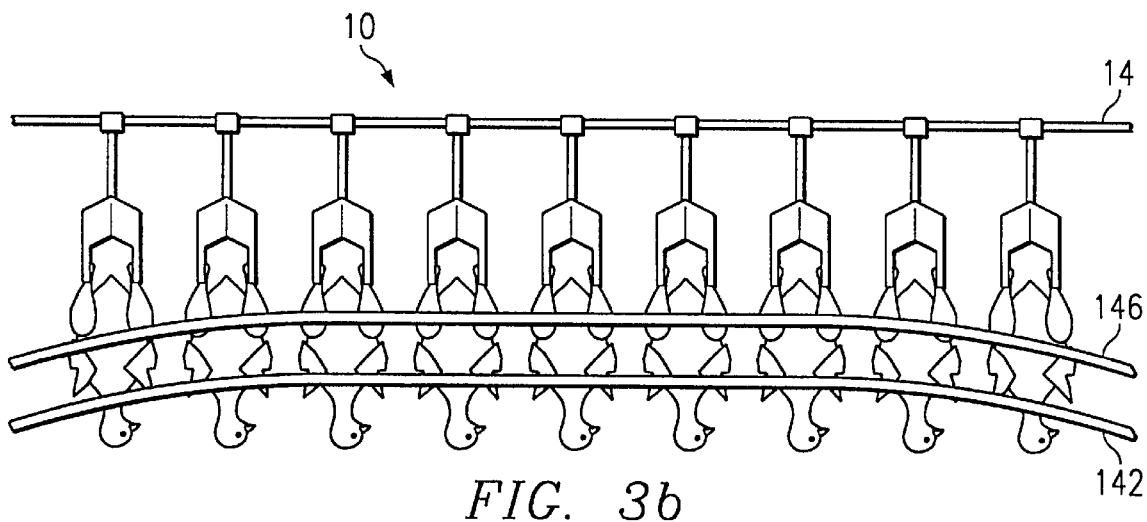
FIG. 3b is a side view of the embodiments shown in FIGS. 3a and 3c–3f.

In an alternative embodiment of the apparatus 10 shown in FIGS. 3a and 3b, the apparatus 10 has curved electrically conductive bars 142 and 146 which are curved along the same arc but slightly offset from the vertical plane through the substantially straight processing line 14 so that the carcasses remain in contact with the carcasses moving along the processing path for the desired stimulation period. The curved conductive bars 142 and 146 further separate the carcasses from one another so that they hang more freely against the conductive bars.

Figure 3C:
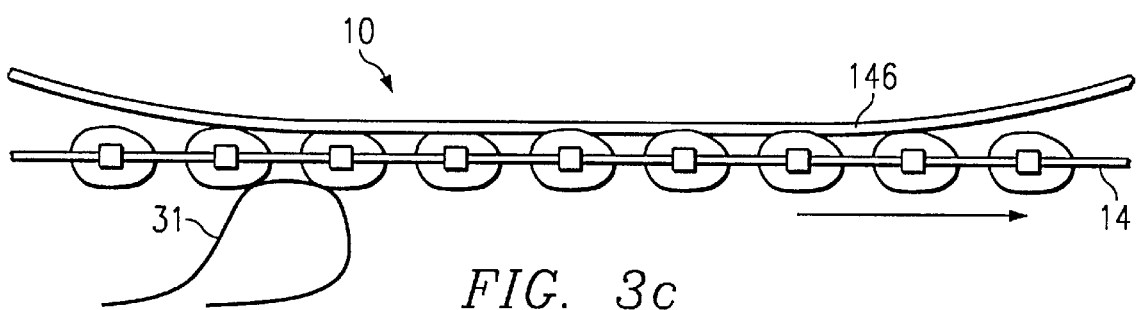

FIGS. 3c–3f illustrate alternative embodiments for providing various positive bias means to ensure the carcasses remain in electrical and physical contact with the conductive bars 142 and 146 so the carcasses are properly electrically stimulated by the constant energy source. In FIG. 3c, the overhead view of the carcasses pressing against electrode conductive bars 142 and 146 using a flexible back-rub belt 31 pressing against the back of the carcass at the initial electrode contact as the carcasses moved through the electrical stimulation process. One or more of these belts 31 are positioned such that a belt 31 presses moderately against the back of the bird. Belt 31 may be made of a suitable non-conductive material, such as rubber, or Teflon TM, or may be constructed of an insulated conductive material.

Figure 3D:
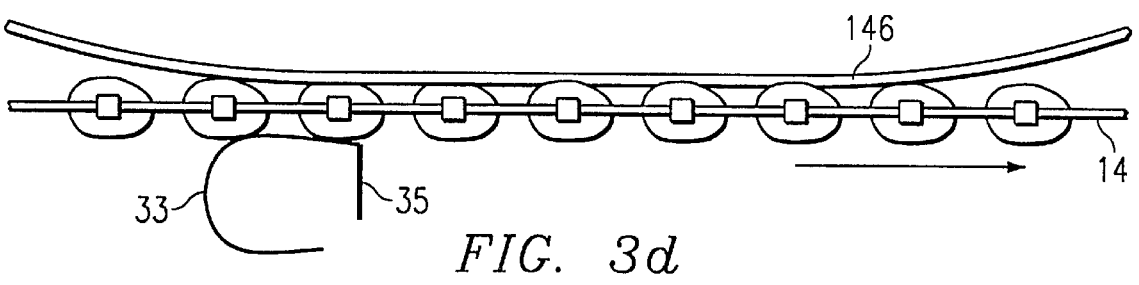

In FIG. 3d, a non-conductive flat slab 33, preferably a ¼ inch×3 inch piece of Teflon TM, is positioned such that the flat surface of slab 33 presses moderately against the back of the bird carcass. An tension adjustment rod 35 is attached to the end of slab 33 to allow adjustment of pressure on the bird's carcass.

In FIG. 3e, a spring-loaded bar 37 is positioned such that it presses moderately against the back of the bird carcass. Bar 37 may be made of a non-conductive material or an insulated conductive material.

In FIG. 3f, one or more spring-loaded wheels 39 are positioned such that a wheel presses moderately against the back of the bird carcass. The wheels 39 are preferably made of a non-conductive material or an insulated conductive material.

The curved conductive bars 142 and 146 shown in FIGS. 3b–3f are used to deflect the carcasses from the vertical plane causing gravity to bring the carcasses into electrical contact with the curved electrode bars 142 and 146. The curvature of the bars is unique and reduces the incidence of a smaller bird carcass being crowded from the conductive bars by one or two adjacent larger carcasses. The curved nature of the conductive bars 142 and 146 allows the carcasses to flow smoothly along the conductive bars while remaining in constant electrical contact with the bars, which provides greater efficiency in providing substantially constant electrical energy to pass from the bars to the carcass.

FIG. 4a illustrates the points at which the conductive bars 142 and 146 are in electrical contact with the carcass. Preferably, the bars are positioned at the proximate ends of the carcass' breast in order that the current flow is through the breast portion of the carcass.

FIGS. 4b and 4c illustrate alternative embodiments where the electrodes may be placed on the carcass in order to automatically apply the substantially constant energy source. In FIG. 4b, a positive electrode 142 is placed near the neck of the carcass and the shackle 116 holding the feet is grounded. There is no negative electrode. In FIG. 4c, the positive electrode 142 is placed at the neck, as in FIG. 4b and the shackle 116 holding the feet is grounded. Additionally, a negative electrode 146 is placed at the end of the breast.

FIGS. 4d and 4e illustrate additional embodiments for applying a constant energy source through the carcass. In FIG. 4d, the head of the carcass is dragged in a saline or water trough 41 and the shackle 116 holding the feet is grounded. The water or saline solution is electrically positively charged which allows the current to flow from the head to the feet.

In FIG. 4e, trough 41 is used to hold electrically positively charged water or saline solution, the shackle holding the feet of the carcass is grounded and a negative electrode 146 is placed at the end of the breast. In this embodiment, the energy will flow from the head of the carcass through the negative electrode 146 at the breast and the grounded shackle 116 at the feet.

In FIG. 4f, a further embodiment is illustrated whereby the head is dragged across a positively charged metal grill or mesh 43, and the shackle 116 holding the feet is grounded. Current flows from the head through the feet in this manner.

In FIG. 4g, the head is once again dragged across a positively charged metal grill 43 and the current flows through the grounded shackle 116 holding the feet and the negative electrode 146 located at the end of the breast.

In operation, the tenderness of various batches of early-harvested chickens processed on a processing line with the stimulation apparatus 10 of the present invention have been compared to similar batches of early-harvested chickens which were processed in a similar manner except for the absence of electrical simulation. In evaluating the tenderness of the processed chicken carcasses, both a taste test and a sheer test were employed.

Figure 5A:
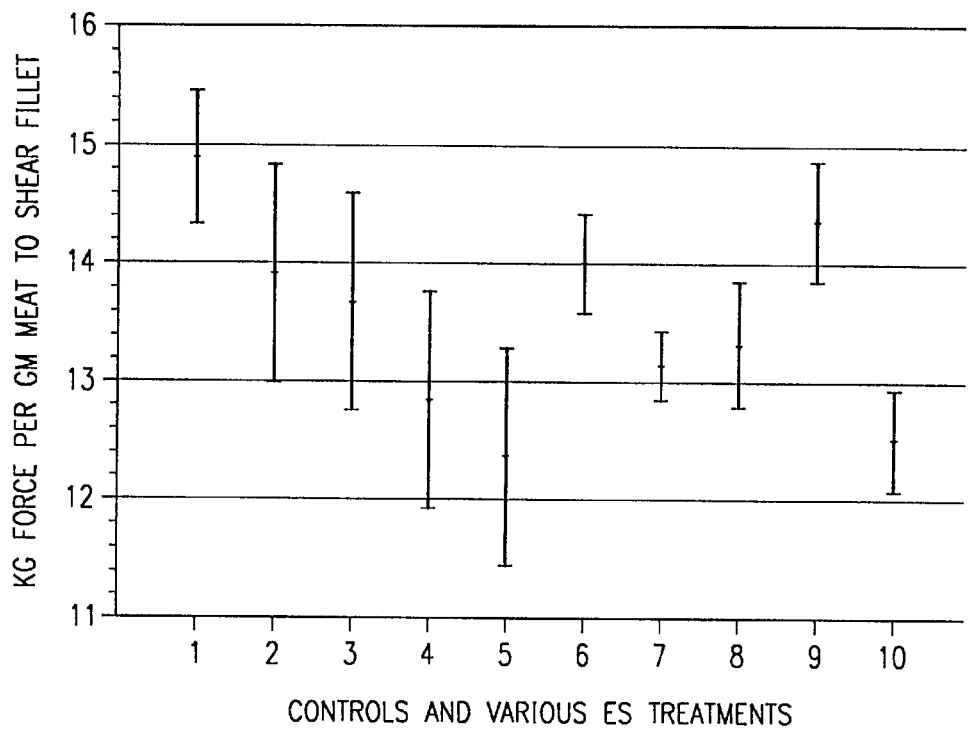
FIG. 5a is a graph showing the shear force values associated with groups of processed poultry carcasses, a portion of which have been electrically stimulated in accordance with the present invention.

FIG. 5a illustrates the resulting shear test values for chickens in various control batches and in various batches subjected to electrical stimulation. In conducting the shear test on control batch labeled, 1, the breast of the processed carcasses were removed from the carcass immediately following the chiller (1 hour post-mortem) and split into two fillets. The fillets were then individually quick frozen, held frozen, thawed overnight in a refrigerator and boiled in water in a sealed waterproof bag, then cooled by water and by refrigeration before being sheared using a conventional shear testing machine, such as an Instron Universal Testing Machine. The resulting shear test values were in the range of 14 to 15.5.

Additional control batches 2, 3, 4, and 5 were tested following the same procedure except that 1, 2, 3, and 4 additional hours of aging, respectively, were permitted prior to the meat being quick frozen. As expected, the range of shear values decreased with additional aging to a minimum of 12–13.

FIG. 5a also reflects shear values for batches 6–10 in which the chicken meat was subjected to varying types of electrical stimulation ("ES"). Except as noted below, the processing parameters of the chicken meat for the shear tests are the same as for batch 1.

In batch 6, the carcasses were subjected to electrical stimulation for 9.29 seconds at 150 volt AC for a period of 10 seconds on and 0.1 second off (nearly constant electrical stimulation). In batch 7, the carcasses were subjected to ES for 8.86 seconds at 150 volt AC at 100 percent duty cycle (commercial line grade). In batch 8, the carcasses were subjected to ES for 9.29 seconds at 150 volt AC at a 100 percent duty cycle. For batch 9, the carcasses were subjected to ES for 11.36 seconds at 150 volt AC at a 100 percent duty cycle. For batch 10, the carcasses were subjected to ES for 8.86 seconds at 160 volt AC at a 100 percent duty cycle. At a 100 percent duty cycle, the carcasses are receiving almost constant electrical stimulation.

Figure 5B:
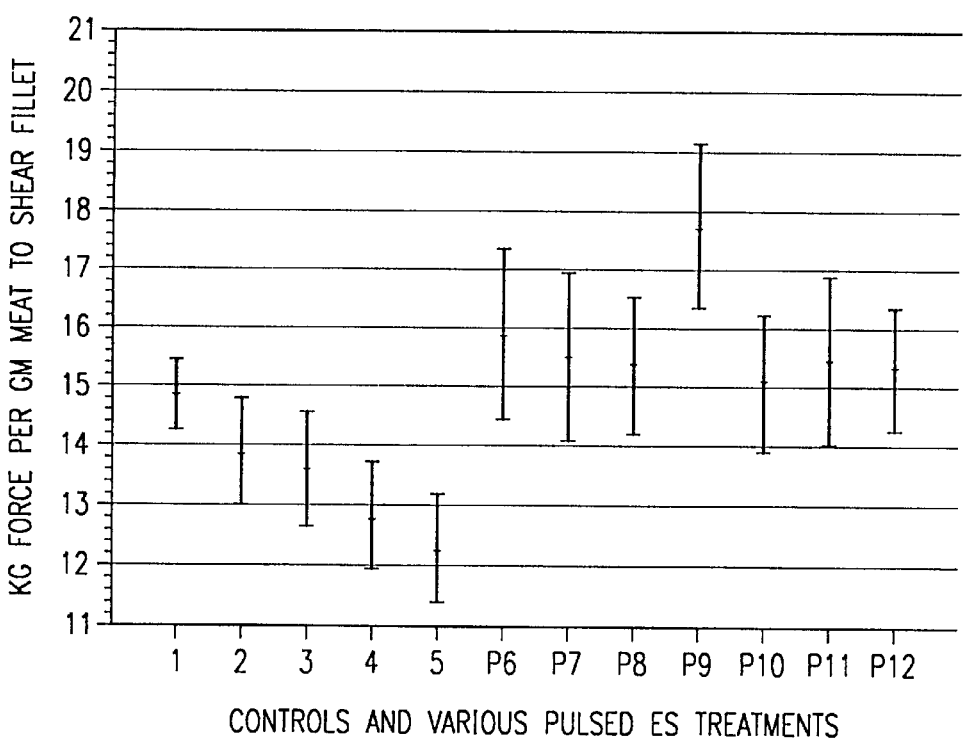
FIG. 5b is a graph showing the shear force values associated with groups of processed carcasses, a portion of which has been electrically stimulated with pulsed voltage.

FIG. 5b shows the measured shear values for the same control batches 1–5 shown in FIG. 5a and also measured shear values for batches P6–P12 of chicken meat which were subjected to pulses of electrical stimulation. Except as noted below, the processing parameters of the chicken meat for the shear tests are the same as those for batches 6–10 in FIG. 5a. In batch P6, the carcasses were subjected to 2 second pulses of 150 volt AC followed by no voltage for 0.5 seconds for a total ES period of 11.14 seconds. In batch P7, the carcasses were stimulated with the same voltage as P6, except the pulse duration was 3 seconds on, and 0.5 seconds off. In batch 8, the carcasses were subjected to 2 second pulses of 200 volt AC, and then no voltage for 0.5 seconds for a total time period of 11.14 seconds. In batch P9, the carcasses were subjected to 2 second pulses of 400 volts AC, followed by no voltages for 0.5 seconds for 11.14 seconds. In batch P10, the carcasses were subjected to 0.1 second pulses of 440 volts AC followed by no voltage for 1 second for 11.14 seconds. In batch P11, the carcasses were subjected to 1.25 second pulses of 150 volt AC followed by 0.1 seconds of no voltage for 11.14 seconds. In batch P12, the carcasses were subjected to 1.25 second pulses of 200 volts AC, followed by no voltage for 0.1 seconds for 11.14 seconds.

As the shear test values in FIGS. 5a and 5b demonstrate, breast meat treated with almost constant electrical stimulation at various intermediate voltages for the time periods indicated were as tender as chicken breast meat aged for several additional hours. Additional shear tests have shown that constant or almost constant ES of chicken carcasses at other voltages between 110 and 250 volts AC and between 8 and 13 seconds result in meat more tender than meat processed without electrical stimulation.

The constant or nearly constant electrical stimulation of chicken carcasses with intermediate voltages for a period of between 8 and 13 seconds to tenderize the meat provides for numerous advantages over previous processing methods. First, the yield of high-value breast meat is increased because deboning is more complete than for aged carcasses. In addition, the need for large, expensive storage areas have been eliminated without adversely affecting the taste of the poultry meat, thereby reducing both capital and operating expenses of the processing plant. The reduction in storage time needed to age the meat also reduces the potential for microbial growth on the stored carcasses.

The above disclosure and description of the invention is illustrative and explanatory thereof rather than limiting. Other embodiments and equivalents of the present invention, as defined by the claims, may now be apparant to a person skilled in the art. Accordingly, the claims should be interpreted as covering all embodiments and equivalents which fall within the spirit and scope of the invention.

What is claimed is:

1. A method of tenderizing poultry meat, comprising the step of:
   (a) passing a substantially constant electric current through the body of a bleeding but dead or substantially dead poult r carcass not less than 20 seconds after the bleeding of the carcass has been initiated.

2. The method of claim 1, in which the current is generated by a substantially constant electrical energy source having a duty cycle of about 100%.

3. The method of claim 1, in which the current is a substantially constant alternating current.

4. The method of claim 3, in which the substantially alternating current is selected from within a range from 120 milliamps to 500 milliamps.

5. The method of claim 1, in which She current is generated by a substantially constant alternating voltage.

6. The method of claim 5, in which the substantially constant alternating voltage is selected from within a range from 110 volts AC to 250 volts AC.

7. The method of claim 1, in which the current is passed through the carcass for between 8 and 13 seconds.

8. The method of claim 1, in which the carcass is selected from the group consisting of:
   (a) a chicken carcass; and
   (b) a turkey carcass.

9. A method of tenderizing poultry meat, comprising the steps of:
   (a) stunning a live poultry bird;
   (b) while still stunned, cutting the bird's throat;
   (c) allowing the bird to bleed until at least substantially dead, but for not less than a period of 20 seconds measured from the completion of step (b); and
   (d) promptly after completion of step (c), passing a substantially constant electrical current through the body of the bird.

10. The method of claim 9, further including the step of:
    (e) prior to step (a), wetting the bird.

11. The method of claim 9, in which step (b) is performed when the bird is starting to regain consciousness after being stunned.

12. The method of claim 9, in which step (c) is performed for approximately 90 seconds after completion of step (b) and before the commencement of step (d).

13. The method of claim 9, in which the current is generated by a substantially constant electrical energy source having a duty cycle of about 100%.

14. The method of claim 9, in which the current is a substantially constant alternating current.

15. The method of claim 14, in which the substantially alternating current is selected from within a range from 120 milliamps to 500 milliamps.

16. The method of claim 9, in which the current is generated by a substantially constant alternating voltage.

17. The method of claim 16, in which the substantially constant alternating voltage is selected from within a range from 110 volts AC to 250 volts AC.

18. The method of claim 9, in which step (d) is performed for between 8 and 13 seconds.

19. The method of claim 9, in which the bird is selected from the group consisting of:
    (a) a chicken; and
    (b) a turkey.

20. A method of tenderizing poultry meat, comprising the steps of:
    (a) mortally wounding a poultry bird; and
    (b) upon at least substantial death of the bird, and not less than 20 second after mortally wounding the bird, passing a substantially constant alternating current through the body of the bird for between 8 and 13 seconds, the current selected from within the range from 120 milliamps to 500 milliamps, the current generated by a substantially constant alternating voltage selected from within a range from 110 volts AC to 250 volts AC and having a duty cycle of about 100%.

* * * * *

UNITED STATES PATENT AND TRADEMARK OFFICE
CERTIFICATE OF CORRECTION

PATENT NO. : 5,888,132
DATED : March 30, 1999
INVENTOR(S) : Bertram B. Burnett

It is certified that error appears in the above-identified patent and that said Letters Patent is hereby corrected as shown below:

Column 3, line 8, change "of an" to --of--;

Column 3, line 40, change "chicken" to --chickens--;

Column 5, line 35, change "feed" to --feet--;

Column 6, line 17, change "TM" to --™--;

Column 6, line 20, change "TM" to --™--;

Column 6, line 22, change "An tension" to --A tension--;

Claim 1, column 8, line 51, change "poult r" to --poultry--; and

Claim 5, column 8, line 61, change "She" to --the--.

Signed and Sealed this

Fourteenth Day of December, 1999

Attest:

Q. TODD DICKINSON

*Attesting Officer*  *Acting Commissioner of Patents and Trademarks*